US008625123B2

(12) United States Patent
Misawa et al.

(10) Patent No.: US 8,625,123 B2
(45) Date of Patent: Jan. 7, 2014

(54) IMAGE FORMING SYSTEM, MANAGEMENT APPARATUS, AND NON-TRANSITORY COMPUTER READABLE MEDIUM

(75) Inventors: Satoshi Misawa, Kanagawa (JP); Kenji Kasai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 44 days.

(21) Appl. No.: 13/465,526

(22) Filed: May 7, 2012

(65) Prior Publication Data

US 2012/0287458 A1 Nov. 15, 2012

(30) Foreign Application Priority Data

May 9, 2011 (JP) ................................ 2011-104359

(51) Int. Cl.
*G06K 15/00* (2006.01)
*G06F 3/12* (2006.01)

(52) U.S. Cl.
USPC ......... 358/1.14; 358/1.15; 713/300; 713/310; 713/330; 713/340; 713/321

(58) Field of Classification Search
USPC ........................................................ 358/1.14
See application file for complete search history.

(56) References Cited

U.S. PATENT DOCUMENTS

| | | | | |
|---|---|---|---|---|
| 2006/0168191 | A1* | 7/2006 | Ives | 709/224 |
| 2007/0070375 | A1* | 3/2007 | Owen | 358/1.13 |
| 2007/0171469 | A1* | 7/2007 | Oh | 358/1.15 |

FOREIGN PATENT DOCUMENTS

| | | |
|---|---|---|
| JP | A-05-072844 | 3/1993 |
| JP | A-2002-073221 | 3/2002 |
| JP | A-2005-018384 | 1/2005 |
| JP | A-2008-191949 | 8/2008 |
| JP | A-2009-222824 | 10/2009 |

OTHER PUBLICATIONS

RCCMD http://www.gedigitalenergy.com/products/software/PowerQuality/RCCMD_Manual_EN.pdf (Jul. 2009).*
Feb. 14, 2012 Notification of Reasons for Refusal issued in Japanese Patent Application No. 2011-104359 (with translation).

* cited by examiner

*Primary Examiner* — Huo Long Chen
(74) *Attorney, Agent, or Firm* — Oliff & Berridge, PLC

(57) ABSTRACT

An image forming system includes uninterruptible power supply apparatuses; image processing apparatuses each connected to a corresponding one of the uninterruptible power supply apparatuses; and a management apparatus that issues, when a fault has occurred in one of the uninterruptible power supply apparatuses, a stop instruction to an image processing apparatus connected to the uninterruptible power supply apparatus. The image processing apparatuses include a first image processing apparatus that develops print information into image information, stores the developed image information, and outputs the stored image information to an image forming apparatus, and a second image processing apparatus that develops the print information into image information and outputs the developed image information to the first image processing apparatus. The management apparatus issues, when the first image processing apparatus is connected to an uninterruptible power supply apparatus in which a fault has occurred, stop instructions to all the image processing apparatuses.

3 Claims, 7 Drawing Sheets

FIG. 6

| | |
|---|---|
| IMAGE PROCESSING APPARATUS 102C (STORAGE UNIT INCLUDED) | UPS106 |
| IMAGE PROCESSING APPARATUS 102M (STORAGE UNIT INCLUDED) | UPS106 |
| IMAGE PROCESSING APPARATUS 102Y (STORAGE UNIT INCLUDED) | UPS106 |
| IMAGE PROCESSING APPARATUS 102K (STORAGE UNIT INCLUDED) | UPS106 |
| IMAGE PROCESSING APPARATUS 102-1 | UPS107 |
| ⋮ | ⋮ |
| IMAGE PROCESSING APPARATUS 102-n | UPS107 |
| IMAGE PROCESSING APPARATUS 102-n+1 | UPS108 |
| ⋮ | ⋮ |

IMAGE FORMING SYSTEM, MANAGEMENT APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2011-104359 filed May 9, 2011.

BACKGROUND

The present invention relates to an image forming system, a management apparatus, and a non-transitory computer readable medium.

Many information processing apparatuses, such as computers, and various apparatuses using such an information processing apparatus use, when using a commercial power supply, an uninterruptible power supply apparatus (UPS) in order to, for example, protect the apparatuses and information even in a case where the status of power supply is unstable due to a power failure and the like.

In the case of using an uninterruptible power supply apparatus, the capacity of the uninterruptible power supply apparatus is determined in accordance with the power consumption of an apparatus that receives power from the uninterruptible power supply apparatus. Accordingly, in the case where the apparatus consumes a large amount of power, a large-capacity uninterruptible power supply apparatus or plural uninterruptible power supply apparatuses are used.

SUMMARY

According to an aspect of the invention, there is provided an image forming system including plural uninterruptible power supply apparatuses, plural image processing apparatuses, and a management apparatus. The image processing apparatuses are each connected to a corresponding one of the uninterruptible power supply apparatuses. The management apparatus issues, when a fault has occurred in one of the uninterruptible power supply apparatuses, a stop instruction to one of the image processing apparatuses that is connected to the uninterruptible power supply apparatus in which the fault has occurred. The image processing apparatuses include a first image processing apparatus that develops print information into image information, stores the developed image information, and outputs the stored image information to an image forming apparatus, and a second image processing apparatus that develops the print information into image information and outputs the developed image information to the first image processing apparatus. The management apparatus issues, in a case where the first image processing apparatus is connected to an uninterruptible power supply apparatus in which a fault has occurred, stop instructions to all the image processing apparatuses.

BRIEF DESCRIPTION OF THE DRAWINGS

Exemplary embodiments of the present invention will be described in detail based on the following figures, wherein:

FIG. 6 illustrates an example of a system configuration management list.

DETAILED DESCRIPTION

Hereinafter, an image forming system, a management apparatus, and a non-transitory computer readable medium according to an exemplary embodiment of the present invention will be described with reference to the drawings.

First Embodiment

Figure 1:
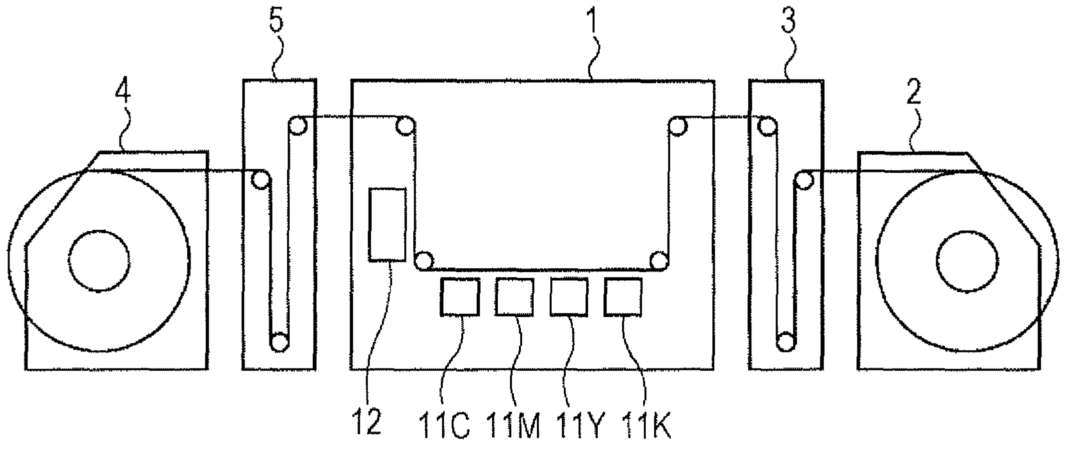
FIG. 1 is a schematic diagram illustrating an image forming apparatus.

FIG. 1 is a schematic diagram illustrating an image forming apparatus. The image forming apparatus illustrated in FIG. 1 includes an image forming apparatus unit 1, a pre-processing apparatus 2 that accommodates paper to be supplied to the image forming apparatus unit 1, a buffer apparatus 3 that is arranged between the image forming apparatus unit 1 and the pre-processing apparatus 2 and that controls the flow of the supplied paper, a post-processing apparatus 4 that accommodates the paper ejected from the image forming apparatus unit 1, and a buffer apparatus 5 that is arranged between the image forming apparatus unit 1 and the post-processing apparatus 4 and that controls the flow of the ejected paper.

The image forming apparatus unit 1 includes a formation processing unit 11C that forms images of cyan (C), a formation processing unit 11M that forms images of magenta (M), a formation processing unit 11Y that forms images of yellow (Y), a formation processing unit 11K that forms images of black (K), and a fixing unit 12 that fixes the images, which are formed by the formation processing units 11C, 11M, 11Y, and 11K and transferred to paper, onto the paper. Each of the formation processing units 11C, 11M, 11Y, and 11K receives image information to be used for image formation from an image processor, which is not illustrated.

Figure 2:
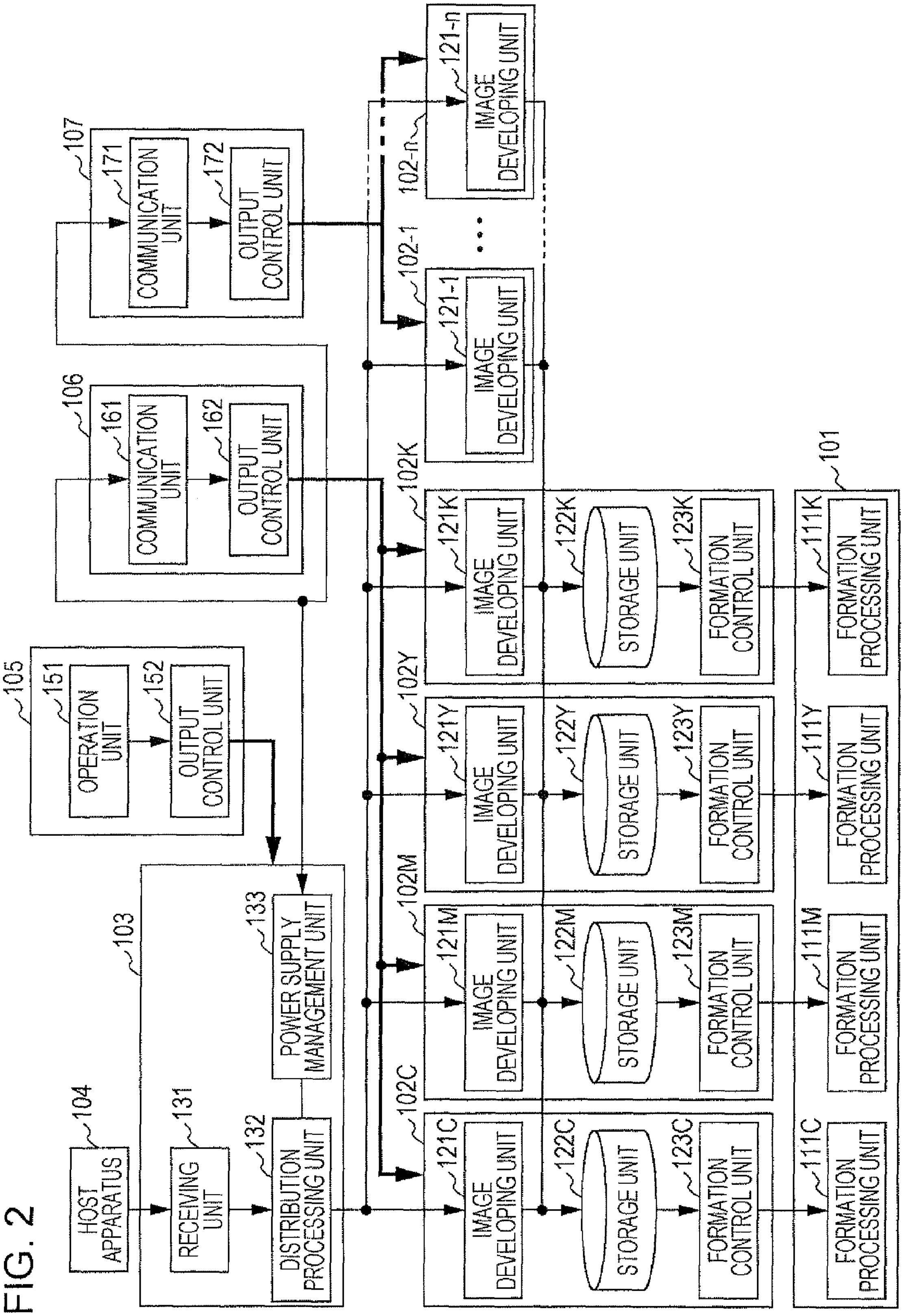
FIG. 2 is a block diagram illustrating an example of the configuration of an image forming system.

An image forming system including the image forming apparatus will now be explained. FIG. 2 is a block diagram illustrating an example of the configuration of the image forming system.

The image forming system illustrated in FIG. 2 includes an image forming apparatus 101, an image processing apparatus 102C, an image processing apparatus 102M, an image processing apparatus 102Y, an image processing apparatus 102K, image processing apparatuses 102-1 to 102-n, a management apparatus 103, a host apparatus 104, an uninterruptible power supply apparatus 105, an uninterruptible power supply apparatus 106, and an uninterruptible power supply apparatus 107.

The image forming apparatus 101 corresponds to the image forming apparatus unit 1 illustrated in FIG. 1. The image forming apparatus 101 includes a formation processing unit 111C, a formation processing unit 111M, a formation processing unit 111Y, and a formation processing unit 111K. The formation processing units 111C, 111M, 111Y, and 111K correspond to the formation processing units 11C, 11M, 11Y and 11K illustrated in FIG. 1, respectively.

The image processing apparatus 102C includes an image developing unit 121C, a storage unit 122C, and a formation control unit 123C. The image developing unit 121C develops print information, such as a rendering instruction, into image information to be used by the image forming apparatus 101 for execution of image formation processing. The image developing unit 121C basically develops image information for cyan. However, the image developing unit 121C may develop image information for other colors. The storage unit 122C stores image information for cyan, out of image information developed by the image developing unit 121C, an image developing unit 121M, an image developing unit 121Y, and an image developing unit 121K, which will be described later, and the image processing apparatuses 102-1 to 102-n. The formation control unit 123C outputs the image information stored in the storage unit 122C to the formation processing unit 111C in accordance with an operation of the image forming apparatus 101, and controls the formation processing unit 111C to form an image of cyan.

The image processing apparatus 102M includes the image developing unit 121M, a storage unit 122M, and a formation control unit 123M. The image developing unit 121M develops print information into image information. The image developing unit 121M basically develops image information for magenta. However, the image developing unit 121M may develop image information for other colors. The storage unit 122M stores image information for magenta, out of image information developed by the image developing unit 121C, the image developing unit 121M, the image developing unit 121Y, the image developing unit 121K, and the image processing apparatuses 102-1 to 102-n. The formation control unit 123M outputs the image information stored in the storage unit 122M to the formation processing unit 111M in accordance with an operation of the image forming apparatus 101, and controls the formation processing unit 111M to form an image of magenta.

The image processing apparatus 102Y includes the image developing unit 121Y, a storage unit 122Y, and a formation control unit 123Y. The image developing unit 121Y develops print information into image information. The image developing unit 121Y basically develops image information for yellow. However, the image developing unit 121Y may develop image information for other colors. The storage unit 122Y stores image information for yellow, out of image information developed by the image developing unit 121C, the image developing unit 121M, the image developing unit 121Y, the image developing unit 121K, and the image processing apparatuses 102-1 to 102-n. The formation control unit 123Y outputs the image information stored in the storage unit 122Y to the formation processing unit 111Y in accordance with an operation of the image forming apparatus 101, and controls the formation processing unit 111Y to form an image of yellow.

Similarly, the image processing apparatus 102K includes the image developing unit 121K, a storage unit 122K, and a formation control unit 123K. The image developing unit 121K develops print information into image information. The image developing unit 121K basically develops image information for black. However, the image developing unit 121K may develop image information for other colors. The storage unit 122K stores image information for black, out of image information developed by the image developing unit 121C, the image developing unit 121M, the image developing unit 121Y, the image developing unit 121K, and the image processing apparatuses 102-1 to 102-n. The formation control unit 123K outputs the image information stored in the storage unit 122K to the formation processing unit 111K in accordance with an operation of the image forming apparatus 101, and controls the formation processing unit 111K to form an image of black.

The image processing apparatus 102-1 includes an image developing unit 121-1. The image developing unit 121-1 develops print information into image information. The image information developed by the image, developing unit 121-1 is stored in one of the storage units 122C, 122M, 122Y, and 122K, depending on the color.

Although abbreviated in FIG. 2, image processing apparatuses corresponding to the image processing apparatus 102-1 are provided in plural form (in FIG. 2, only the image processing apparatus 102-1 and the image processing apparatus 102-*n* are illustrated, as examples).

The management apparatus 103 includes a receiving unit 131, a distribution processing unit 132, and a power supply management unit 133. The receiving unit 131 receives print information from the host apparatus 104. The distribution processing unit 132 distributes the print information to one of the image processing apparatuses 102C, 102M, 102Y, and 102K and the image processing apparatuses 102-1 to 102-n. Basically, the distribution processing unit 132 distributes print information for cyan, magenta, yellow, and black to the image processing apparatuses 102C, 102M, 102Y, and 102K, respectively. However, if image development for a specific color requires a processing time longer than image development for other colors, the destination of the distribution is determined irrespective of the color. The power supply management unit 133 manages the operating status of the uninterruptible power supply apparatus 106, the uninterruptible power supply apparatus 107, and so on (in some cases, further uninterruptible power supply apparatuses may be connected to the power supply management unit 133) to activate or stop the uninterruptible power supply apparatus 106, the uninterruptible power supply apparatus 107, and so on. If a fault has occurred in the uninterruptible power supply apparatus 106, the uninterruptible power supply apparatus 107, or the like, the power supply management unit 133 performs processing for, for example, changing the status of the image forming system or stopping the image forming system.

The host apparatus 104 generates print information and outputs the generated print information to the management apparatus 103.

The uninterruptible power supply apparatus 105 includes an operation unit 151 and an output control unit 152. When the uninterruptible power supply apparatus 105 starts an operation in accordance with an operation performed on the operation unit 151, the output control unit 152 starts supply of power to the management apparatus 103.

The uninterruptible power supply apparatus 106 includes a communication unit 161 and an output control unit 162. When the communication unit 161 receives an activation instruction from the power supply management unit 133 of the management apparatus 103, the uninterruptible power supply apparatus 106 starts an operation. The output control unit 162 starts supply of power to the image processing apparatuses 102C, 102M, 102Y, and 102K. If a fault has occurred in the uninterruptible power supply apparatus 106, the uninterruptible power supply apparatus 106 notifies, via the communication unit 161, the management apparatus 103 of the occurrence of the fault.

The uninterruptible power supply apparatus 107 includes a communication unit 171 and an output control unit 172. When the communication unit 171 receives an activation instruction from the power supply management unit 133 of the management apparatus 103, the uninterruptible power supply apparatus 107 starts an operation. The output control unit 172 starts supply of power to the image processing apparatus 102-1, the image processing apparatus 102-*n*, and so on. If a fault has occurred in the uninterruptible power supply apparatus 107, the uninterruptible power supply apparatus 107 notifies, via the communication unit 171, the management apparatus 103 of the occurrence of the fault.

Figure 3:
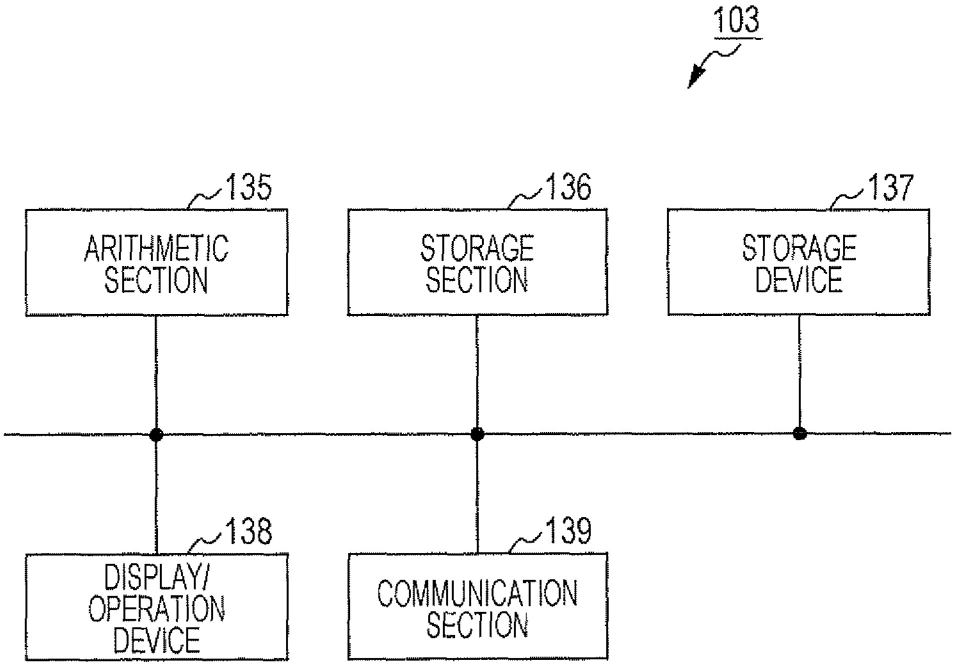
FIG. 3 illustrates an example of the configuration of a management apparatus.

The configuration of the management apparatus 103 will now be explained. FIG. 3 illustrates an example of the configuration of the management apparatus 103.

Referring to FIG. 3, the management apparatus 103 includes an arithmetic section 135, a storage section 136, a storage device 137, a display/operation device 138, and a communication section 139.

The arithmetic section 135 performs arithmetic processing. For example, the arithmetic section 135 is implemented by a processor such as a central processing unit (CPU).

The storage section 136 stores a program, setting information, and the like. For example, the storage section 136 is implemented by a semiconductor storage element such as a read only memory (ROM), a nonvolatile memory, or the like. The storage section 136 is used for a work area or the like to be used when the arithmetic section 135 performs arithmetic processing and temporarily stores information and the like. The storage section 136 may be implemented by a semiconductor storage element such as a random access memory (RAM).

The storage device 137 stores information and the like. The storage device 137 is implemented by a magnetic disk, a semiconductor storage element, or the like.

The display/operation device 138 operates as a user interface.

The communication section 139 is an interface to be used for communication and is implemented by an integrated circuit or the like. In the case where a dedicated communication line or the like is used for communication between the power supply management unit 133 and the communication unit 161, the communication section 139 is provided in plural form.

When the arithmetic section 135 and the like operate in accordance with a program stored in the storage device 137, the management apparatus 103 executes functions of the receiving unit 131, the distribution processing unit 132, and the power supply management unit 133. The program stored in the storage device 137 may be supplied via an optical storage medium such as a compact disk-read only memory (CD-ROM) or other types of media. The program may also be supplied via a network.

Figure 4:
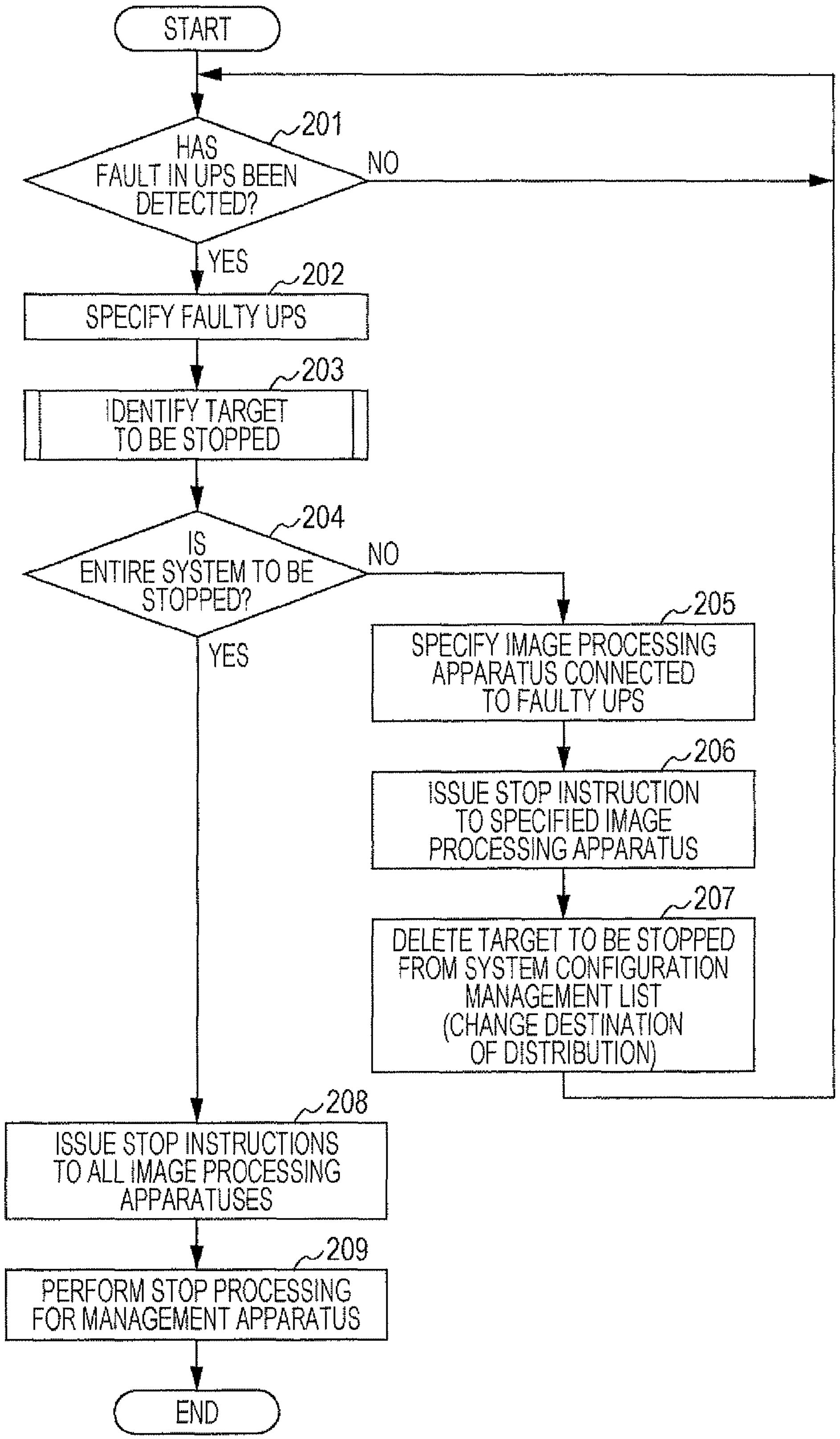
FIG. 4 is a flowchart illustrating the flow of a process performed by the management apparatus.
Figure 5:
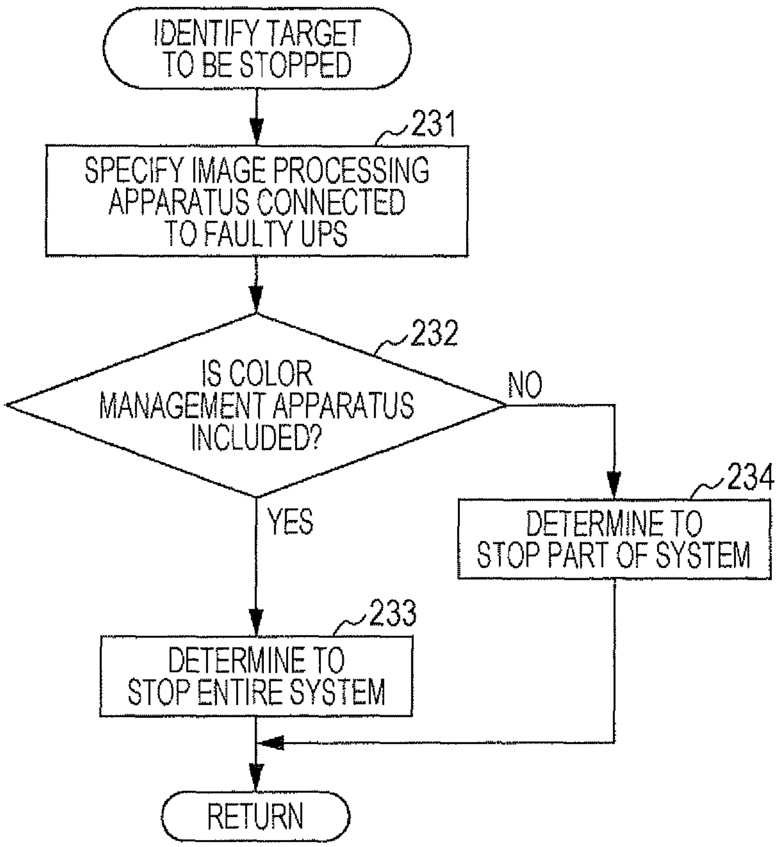
FIG. 5 is a flowchart illustrating the flow of a process performed by the management apparatus.

A process for changing the status of the image forming system or stopping the image forming system to be performed in the case where a fault has occurred in an uninterruptible power supply apparatus will now be explained in accordance with an operation of the management apparatus 103. FIGS. 4 and 5 are flowcharts illustrating processes performed by the management apparatus 103.

When the power supply management unit 133 of the management apparatus 103 receives a notification indicating a fault from an uninterruptible power supply apparatus (UPS), the management apparatus 103 determines that a fault in the uninterruptible power supply apparatus has been detected (YES in step 201), and specifies the uninterruptible power supply apparatus in which the fault has occurred (step 202). Specification of an uninterruptible power supply apparatus in which a fault has occurred is performed on the basis of the identification number, network address, and the like of the uninterruptible power supply apparatus. A fault in an uninterruptible power supply apparatus is not necessarily detected on the basis of a notification from the uninterruptible power supply apparatus. The power supply management unit 133 may query an uninterruptible power supply apparatus as to whether a fault has occurred.

When the uninterruptible power supply apparatus in which the fault has occurred is specified, the power supply management unit 133 identifies an image processing apparatus to be stopped (step 203). In this identification processing, the power supply management unit 133 first specifies an image processing apparatus that is connected to the uninterruptible power supply apparatus in which the fault has occurred and that receives power from the uninterruptible power supply apparatus (step 231 in FIG. 5). The power supply management unit 133 specifies the image processing apparatus on the basis of a system configuration management list stored in the management apparatus 103. The system configuration management list is, for example, as illustrated in FIG. 6. For example, in the system configuration management list, combinations of operating image processing apparatuses and uninterruptible power supply apparatuses to which the image processing apparatuses are connected are described. The system configuration management list is generated by sequentially reading, for image processing apparatuses activated when the image forming system is activated, information on the combinations of image processing apparatuses and uninterruptible power supply apparatuses set in advance.

When the image processing apparatus specified to be connected to the uninterruptible power supply apparatus in which the fault has occurred includes a color management apparatus (YES in step 232), the power supply management unit 133 determines that the entire image forming system is to be stopped (step 233). When the image processing apparatus specified to be connected to the uninterruptible power supply apparatus in which the fault has occurred does not include a color management apparatus (NO in step 232), the power supply management unit 133 determines that part of the image forming system is to be stopped (step 234). Then, the process for identifying an image processing apparatus to be stopped is terminated. A color management apparatus includes a storage unit that stores image information and a formation control unit that outputs the image information to an image forming apparatus. The image processing apparatus 102C including the storage unit 122C and the formation control unit 123C, the image processing apparatus 102M including the storage unit 122M and the formation control unit 123M, the image processing apparatus 102Y including the storage unit 122Y and the formation control unit 123Y, and the image processing apparatus 102K including the storage unit 122K and the formation control unit 123K correspond to color management apparatuses.

When, in accordance with the result of the process for identifying an image processing apparatus to be stopped, it is determined that part of the image forming system is to be stopped (NO in step 204), the power supply management unit 133 specifies, on the basis of the system configuration management list, an image processing apparatus connected to the uninterruptible power supply apparatus in which the fault has occurred (step 205), and sends a stop instruction to the specified image processing apparatus (step 206). Basically, the power supply management unit 133 sends a stop instruction, via the distribution processing unit 132, using a communication path through which print information is distributed. However, the power supply management unit 133 may send stop instructions directly to individual image processing apparatuses.

After sending the stop instruction to the image processing apparatus connected to the uninterruptible power supply apparatus, the power supply management unit 133 deletes from the system configuration management list the image processing apparatus to which the stop instruction has been sent (step 207). Then, the process is terminated. In this case, the image forming system continues to perform an operation, while using only an image processing apparatus that is not stopped. At this time, the distribution processing unit 132 refers to the system configuration management list to exclude the stopped image processing apparatus from destinations of distribution of print information. Accordingly, the destination of distribution is changed in such a manner that print information is to be distributed only to an operating image processing apparatus.

When, in accordance with the result of the process for identifying an image processing apparatus to be stopped, it is determined that the entire image forming system is to be stopped (YES in step 204), the power supply management unit 133 sends stop instructions to all the image processing apparatuses, on the basis of the system configuration management list (step 208). Basically, the power supply management unit 133 sends a stop instruction, via the distribution processing unit 132, using a communication path through which print information is distributed. However, the power supply management unit 133 may send stop instructions directly to individual image processing apparatuses.

After sending the stop instructions to all the image processing apparatuses, the power supply management unit 133 causes the management apparatus 103 to perform stop processing for itself (step 209), and the process is terminated.

The above-described processing will be explained more specifically. For example, as illustrated in FIG. 6, in the system configuration management list, the image processing apparatus 102C, the image processing apparatus 102M, the image processing apparatus 102Y, and the image processing apparatus 102K connected to the uninterruptible power supply apparatus 106, the image processing apparatus 102-1, the image processing apparatus 102-n, and so on connected to the uninterruptible power supply apparatus 107, an image processing apparatus 102-(n+1) and so on (not illustrated in FIG. 2) connected to an uninterruptible power supply apparatus 108 (not illustrated in FIG. 2), and so on exist, and all the apparatuses are normally operating.

In this state, when a fault has occurred in the uninterruptible power supply apparatus 108, since the image processing apparatus 102C, the image processing apparatus 102M, the image processing apparatus 102Y, or the image processing apparatus 102K, which corresponds to a color management apparatus, is not connected to the uninterruptible power supply apparatus 108, it is determined that part of the image forming system is to be stopped (NO in step 232, and then step 204). Thus, only the image processing apparatus 102-(n+1) and so on connected to the uninterruptible power supply apparatus 108 are stopped.

Similarly, when a fault has occurred in the uninterruptible power supply apparatus 107, since the image processing apparatus 102C, the image processing apparatus 102M, the image processing apparatus 102Y, or the image processing apparatus 102K, which corresponds to a color management apparatus, is not connected to the uninterruptible power supply apparatus 107, it is determined that part of the image forming system is to be stopped (NO in step 232, and then step 234). Thus, only the image processing apparatus 102-1, the image processing apparatus 102-n, and so on are stopped.

Furthermore, in the state where a fault has occurred in the uninterruptible power supply apparatus 108 and the image processing apparatus 102-(n+1) and so on are stopped and where the image processing apparatus 102C, the image processing apparatus 102M, the image processing apparatus 102Y, the image processing apparatus 102K, the image processing apparatus 102-1, the image processing apparatus 102-n, and so on are operating, when a fault has occurred in the uninterruptible power supply apparatus 107, the image processing apparatus 102-1, the image processing apparatus 102-n, and so on are stopped for the uninterruptible power supply apparatus 107. Thus, the image forming system is operated by the image processing apparatus 102C, the image processing apparatus 102M, the image processing apparatus 102Y, and the image processing apparatus 102K.

In contrast, when a fault has occurred in the uninterruptible power supply apparatus 106, since the image processing apparatus 102C, the image processing apparatus 102M, the image pickup apparatus 102Y, and the image processing apparatus 102K, which correspond to color management apparatus, are connected to the uninterruptible power supply apparatus 106, it is determined that the entire image forming system is to be stopped (YES in step 232, and then step 233). Thus, all the image processing apparatuses and the management apparatus 103 are stopped.

Figure 7:
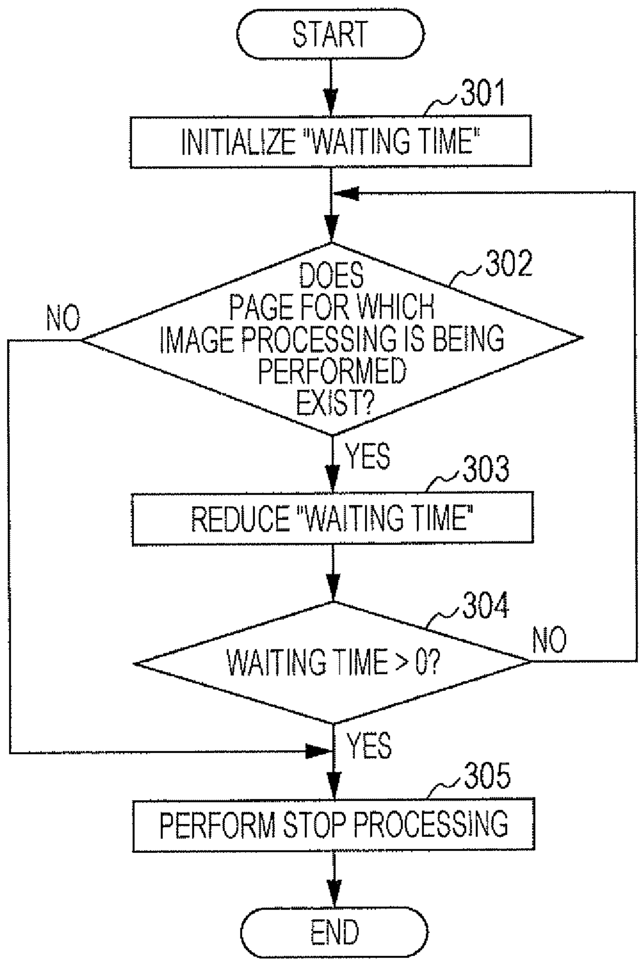
FIG. 7 is a flowchart illustrating the flow of a stop process performed by an image processing apparatus.

A stop process performed by an image processing apparatus (for example, the image processing apparatus 102C) will now be explained. FIG. 7 is a flowchart illustrating the flow of a stop process performed by an image processing apparatus.

When receiving a stop instruction from the management apparatus 103, an image processing apparatus (102C) starts a stop process. First, a "waiting time" as a variable is initialized to a predetermined value (step 301). This value is determined in accordance with the capacity of the battery of the uninterruptible power supply apparatus (106), the number of image processing apparatuses connected to the uninterruptible power supply apparatus, and the like. In addition, during the period of time represented by this value, the image processing apparatus (102C) are able to operate.

Then, the image processing apparatus (102C) continues to operate when a page (part of print information) for which image processing is being performed exists (YES in step 302) and the variable representing the "waiting time" is positive (NO in step 304). During this period of time, the variable representing the "waiting time" is reduced with time (step 303).

Then, when image processing is terminated (NO in step 302) or the variable representing the "waiting time" reaches "0" (YES in step 304), the image processing apparatus (102C) performs processing for stopping the operation (step 305). Then, the process is terminated. The processing for stopping the operation includes processing for storing various types of information, like shutdown processing for general computers.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising;

a first uninterruptible power supply apparatus;

a second uninterruptible power supply apparatus;

a first image processing apparatus connected to the first uninterruptible power supply apparatus, the first image processing apparatus using the first uninterruptible power supply apparatus, and develops a first print information into a first image information;

wherein the first image processing apparatus corresponds to a color management apparatus:

a second image processing apparatus connected to the second uninterruptible power supply apparatus, the second image processing apparatus using the second uninterruptible power supply apparatus, and develops a second print information into a second image information; and a management apparatus that issues, when a fault has occurred in one of the first uninterruptible power supply apparatus and the second uninterruptible power supply apparatus, a stop instruction to one of the first image processing apparatus and the second image processing apparatus that is connected to the one of the first uninterruptible power supply apparatus and the second uninterruptible power supply apparatus in which the fault has occurred, wherein the first image processing apparatus outputs a first image information or a second image information output from the second image processing apparatus to an image forming apparatus, and the second image processing apparatus outputs the second image information to the first image processing apparatus, and wherein when a fault occurs only in the first uninterruptible power supply apparatus connected to the color management apparatus, the management apparatus issues stop instructions to both the first image processing apparatus and the second image processing apparatus, and when a fault occurs only in the second uninterruptible power supply apparatus, the second uninterruptible power supply apparatus not being connected with a color management apparatus, the management apparatus issues stop instructions to only the second image processing apparatus.

2. The image forming system according to claim 1, wherein the management apparatus distributes print information to the first image processing apparatus and the second image processing apparatus, and wherein when issuing a stop instruction to the one of the first image processing apparatus and the second image processing apparatus, the management apparatus excludes from destinations of distribution of the print information the one of the first image processing apparatus and the second image processing apparatus to which the stop instruction has been issued.

3. The image forming system according to claim 1, wherein in a case where the one of the first image processing apparatus and the second image processing apparatus is developing print information into image information when receiving a stop instruction from the management apparatus, the one of the first image processing apparatus and the second image processing apparatus performs stop processing in accordance with the stop instruction after developing of the print information into the image information is completed.

* * * * *